United States Patent [19]

Perea et al.

[11] Patent Number: 5,772,712
[45] Date of Patent: Jun. 30, 1998

[54] MANUALLY CLOSABLE VACUUM CLEANER BAG COLLAR AND METHOD OF MAKING

[75] Inventors: Humberto Perea, Paterson; Mark D. Bosses, Montvale, both of N.J.; Uri Milstein, Flushing, N.Y.

[73] Assignee: Home Care Industries, Inc., Clifton, N.J.

[21] Appl. No.: 958,971

[22] Filed: Oct. 28, 1997

Related U.S. Application Data

[63] Continuation of Ser. No. 661,225, Jun. 10, 1996, Pat. No. 5,725,620.
[51] Int. Cl.[6] ............................. B01D 46/02; B29C 53/04
[52] U.S. Cl. ............................... 55/367; 15/347; 55/369; 55/DIG. 2; 55/DIG. 3; 156/227; 264/249; 264/339
[58] Field of Search ........................... 55/367, 369, 374, 55/381, 370, 371, 373, 378, 496, 497, 504, 505, 506, DIG. 2, DIG. 3; 156/227; 15/347; 264/249, 339

[56] References Cited

U.S. PATENT DOCUMENTS

| 2,804,167 | 8/1957 | Seck | 55/367 |
|---|---|---|---|
| 3,724,179 | 4/1973 | Leinfelt | 55/367 |
| 3,933,451 | 1/1976 | Johansson | 55/367 |
| 4,861,357 | 8/1989 | Gavin et al. | 55/367 |
| 5,045,099 | 9/1991 | Goldberg | 55/367 |
| 5,158,635 | 10/1992 | Schmierer et al. | 55/367 |
| 5,468,272 | 11/1995 | Schmierer | 55/367 |
| 5,472,460 | 12/1995 | Schmierer | 55/367 |
| 5,472,465 | 12/1995 | Schmierer | 55/367 |
| 5,725,620 | 3/1998 | Perea et al. | 55/367 |

FOREIGN PATENT DOCUMENTS

| 361240 | 9/1989 | European Pat. Off. . |
|---|---|---|
| 362624 | 9/1989 | European Pat. Off. . |
| 499168 | 2/1992 | European Pat. Off. . |
| 627189 | 5/1994 | European Pat. Off. . |
| 3408564 | 3/1984 | Germany . |
| 3919256 | 6/1989 | Germany . |
| 4237035 | 11/1992 | Germany . |
| 4342267 | 12/1992 | Germany . |
| 5-154073 | 6/1993 | Japan . |
| 5-199965 | 8/1993 | Japan . |
| 27162 | of 1909 | United Kingdom ..................... 55/367 |

Primary Examiner—Richard L. Chiesa
Attorney, Agent, or Firm—Amster, Rothstein & Ebenstein

[57] ABSTRACT

A manually closable collar for a vacuum cleaner bag is adapted to be secured to an air bag. The collar is formed from a single blank of relatively rigid material folded to define three overlying and generally planar panels. Each of the panels defines an aperture therethrough, the apertures being initially aligned in the collar to enable the passage of air therethrough and into the air bag. The middle panel of the collar defines (i) a fixed raceway element adhesively secured to at least one of the outer panels of the collar, and (ii) a detachable slider element secured to the raceway element only by various nicks. The slider element has a first portion defining the aperture of the middle panel and a second portion which is unapertured. When detached from the raceway element by a user breaking the various nicks, the slider element is manually slidably movable (either longitudinally or rotatably) from a first or open position, wherein the aperture of the middle panel is aligned with the apertures of the outer panels, to a second or closed position, wherein the second portion blocks air flow between the apertures of the outer panels.

11 Claims, 6 Drawing Sheets

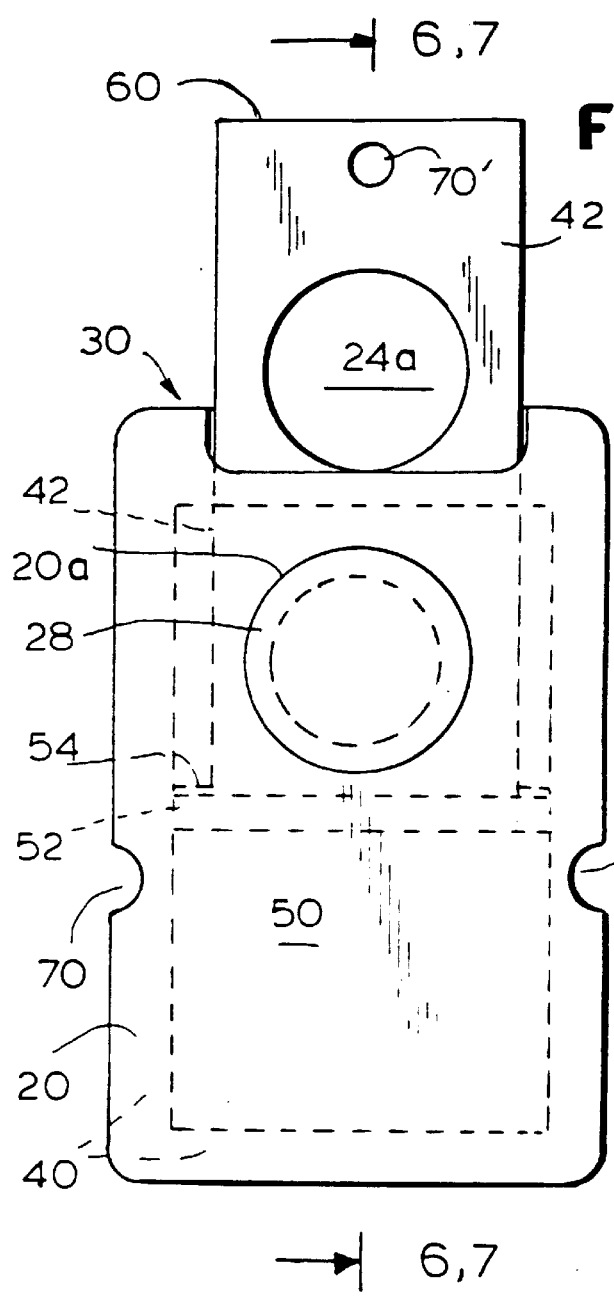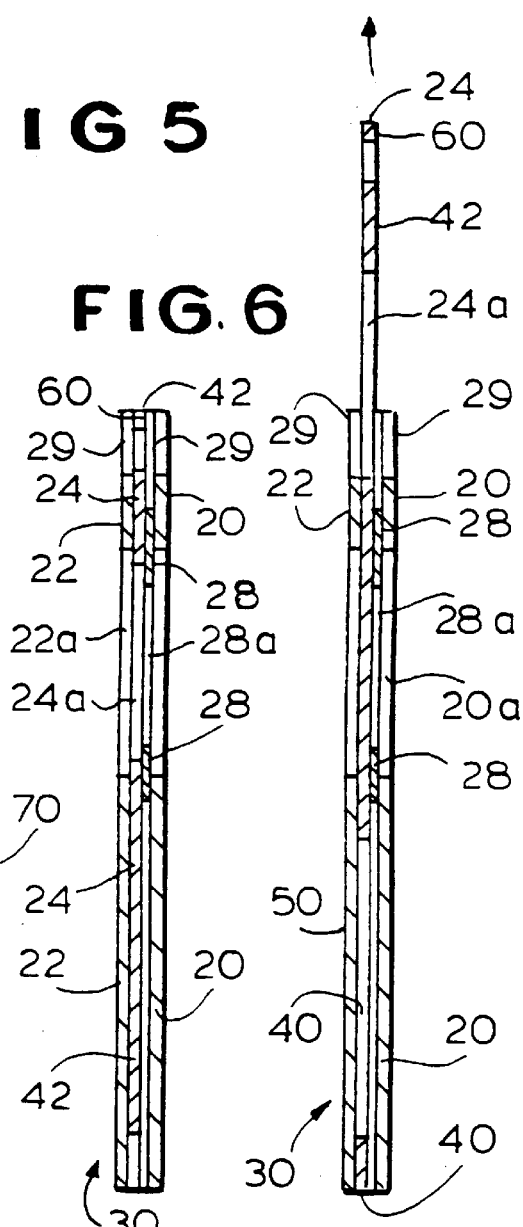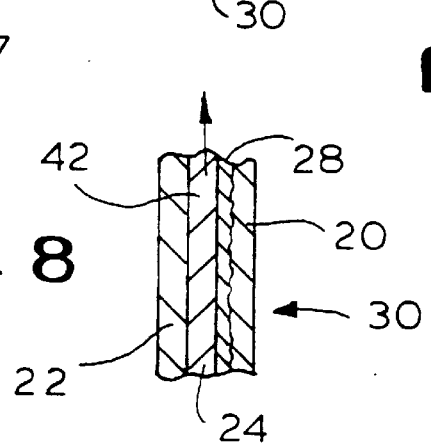

5,772,712

MANUALLY CLOSABLE VACUUM CLEANER BAG COLLAR AND METHOD OF MAKING

This is a continuation of application Ser. No. 08/661,225 filed on Jun. 10, 1996, now U.S. Pat. No. 5,725,620.

BACKGROUND OF THE INVENTION

The present invention relates to a disposable vacuum bag for use in a vacuum cleaner and, more particularly, to one having a manually closable vacuum bag collar.

The disposable vacuum bags for use in a vacuum cleaner are typically provided with collars having closure means such that, when the vacuum bag is removed from the vacuum cleaner after use, it may be closed or sealed to retain therein the dirt and like particulate matter trapped in the bag. While great ingenuity, time and effort have been directed to the provision of a reliable automatically closable collar—that is, a collar which is reliably self-sealing upon removal from the air intake pipe of a vacuum cleaner—many disposable vacuum bag users still prefer the certainty of a manually closable collar—that is, a collar which the user himself seals after removal of the vacuum bag from the air intake pipe.

A wide variety of manually closable collars have been available on the market at one time or another. Many of them require the presence of an easily flexible portion enabling movement of a closure member from one location to another. The provision of an easily flexible collar portion, of course, makes for a complex and hence costly collar. While the basic vacuum bag may have only a three-ply collar, some of the manually closable constructions require additional layers, thus increasing the material cost and manufacturing expense of producing such bags. Finally, in the known three-ply collars of manually closable bags not requiring a flexible collar portion, higher production costs are involved. Once the collar has been appropriately folded, the fold between the closure member and another ply of the collar must be cut in order to free the closure member for movement relative to the remainder of the collar. This extra processing step entails additional manufacturing expense as well as the waste of a certain amount of the raw material since a fold between the closure member and another ply must be cut away and discarded.

Accordingly, it is an object of the present invention to provide a manually closable collar for a vacuum cleaner bag, which collar is economical to manufacture (as it does not require the collar to include a flexible portion) and easy to manufacture (as it does not require a final cutting step in order to free the closure member for movement relative to the remainder of the collar).

SUMMARY OF THE INVENTION

It has now been found that the above and related objects of the present invention are obtained in a manually closable collar for a vacuum cleaner bag comprising a collar adapted to be secured to an air bag. The collar is formed from a single blank of relatively rigid material folded to define three overlying and generally planar panels. Each of the panels defines an aperture therethrough, the apertures being initially aligned in the collar to enable the passage of air therethrough and into the air bag. The middle panel of the collar defines (i) a fixed raceway element adhesively secured to at least one of the outer panels of the collar, and (ii) a detachable slider element secured to the raceway element only by various nicks. The slider element has a first portion defining the aperture of the middle panel and a second portion which is unapertured. When detached from the raceway element by a user breaking the various nicks, the slider element is manually slidably movable from a first or open position, wherein the aperture of the middle panel is aligned with the apertures of the outer panels, to a second or closed position, wherein the second portion blocks air flow between the apertures of the outer panels.

In a preferred embodiment, the raceway element includes means for precluding removal of the slider element entirely from the raceway element after the slider element is detached from the raceway element. The slider element additionally includes means extending beyond the outer panels and enabling manual grasping of the slider element for detaching of the slider element from the raceway element and for movement thereof from the first or open position to the second or closed position. In a first embodiment, the slider element is axially slidably movable from the first or open position to the second or closed position; in a second embodiment, the slider element is rotatably slidably movable from the first or open position to the second or closed position.

The collar preferably additionally includes a resilient membrane intermediate the middle panel and one of the outer panels, the membrane defining an aperture therethrough aligned with the apertures of the outer panels and with the aperture of the middle panel when the slider element is in the first or open position.

The present invention also encompasses a method of making a manually closable collar for a vacuum cleaner bag from a single collar blank. The steps include folding a single collar blank of relatively rigid material to define three overlying and generally planar panels. Each of the panels defines an aperture therethrough, the apertures being initially aligned in the folded blank to enable the passage of air therethrough. The middle panel of the collar defines a fixed raceway element and a detachable slider element secured to the raceway element only by various nicks. The slider element has a first portion defining the aperture of the middle panel and a second portion which is unapertured. The raceway element is adhesively secured to at least one, and preferably both, of the outer panels. When detached from the raceway element by the user of the vacuum bag breaking the various nicks, the slider element is manually slidably movable from a first or open position, wherein the aperture of the middle panel is aligned with and enables air flow between the apertures of the outer panels, to a second or closed position, wherein the second portion is aligned with and blocks air flow between the apertures of the outer panels.

In a preferred embodiment, the method includes the initial step of preparing the middle panel for folding by severing the slider element from the raceway element except for the various nicks, and the additional step of disposing a resilient membrane intermediate the middle panel and the other of the outer panels, the resilient membrane defining an aperture aligned with the outer panel apertures.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 5 is a front plan view, to an enlarged scale, of the collar with the closure member of the second panel in the closed position;

FIG. 6 is a sectional view taken along the line 6—6 of FIG. 5 with the closure member in the open position;

FIG. 7 is a sectional view taken along the line 7—7 of FIG. 5 with the closure member in the closed position;

FIG. 8 is a fragmentary view, to a greatly enlarged scale, of a portion of FIG. 6.

DETAILED DESCRIPTION OF THE PREFERRED EMBODIMENTS

Figure 1:
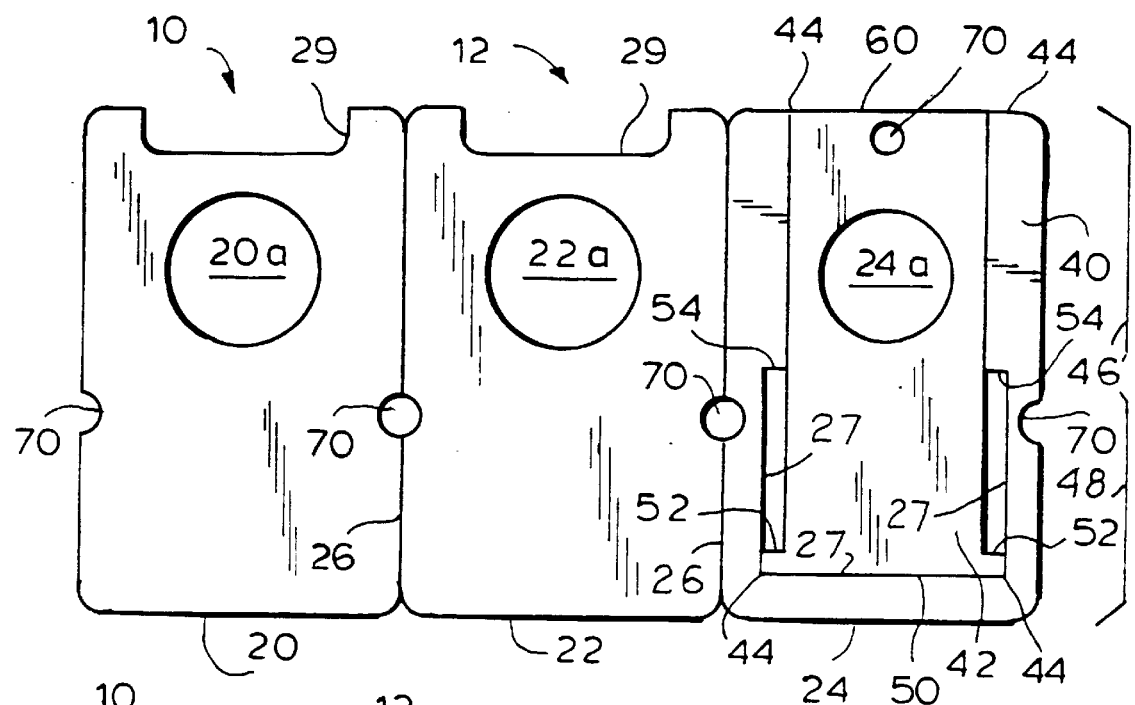
FIG. 1 is a front plan view of a blank for making a first embodiment of the collar according to the present invention.

Referring now to the drawing, and in particular to FIGS. 1–7 thereof, therein illustrated is a first embodiment of the present invention, generally designated by the reference numeral 10. Referring now to FIG. 1, therein illustrated is a single piece paperboard blank, generally designated 12, for a manually closable (or manually sealable) collar, generally designated 30, for a vacuum cleaner bag (not shown). The collar 30 thus formed is adapted to be secured to an air bag (not shown) by conventional means, such as glue, in order to form a manually closable vacuum cleaner bag.

The blank 12 is formed of relatively rigid material defining three generally rectangular, generally planar panels 20, 22 and 24. Foldlines 26 are disposed between the panels 20, 22 and the panels 22, 24. The foldlines enable the first and third panels 20, 24 to be pivoted relative to the second panel 22 (see FIGS. 3 and 4) so that the three panels 20, 22, 24 are in overlying disposition, thereby to define the paperboard aspects of the collar seen in FIGS. 4–7.

Each of the panels 20, 22, 24 defines a respective aperture therethrough 20a, 22a, 24a. In the collar 30, the various apertures 20a, 22a, 24a are initially aligned to enable the passage of air and/or an air intake (not shown) therethrough and into the air bag. The apertures 20a and 22a are preferably of equal diameter, with the aperture 24a optionally being of lesser diameter and thus the constraining element in the flow of air among the several apertures of the collar 30.

To assist the viewer in seeing the transformation from the blank 12 of FIG. 1 to the collar 30 of FIG. 5, it should be noted that the first and second panels 20 and 22 of the blank 12 will be the outer panels of the collar 30, while the third panel 24 will be the intermediate panel disposed between the outer panels 20, 22 in the collar 30.

The third or intermediate panel 24 contains a closure element. More particularly, as best seen in FIG. 1, the third or intermediate panel 24 of the collar 30 defines a fixed raceway element 40 and a detachable slider element or closure 42. Cut lines 27 almost entirely separate elements 40 and 42 of panel 24. The slider element 42 remains secured to the raceway element 40 only by various nicks 44 (four nicks being illustrated). The nicks 44 are barely visible bridges connecting the four corner edges of the slider element 42 to the adjacent edges of the raceway element 40. Each of the nicks 44 may constitute one or more of such bridges, the nicks being strong enough assisting in maintaining the slider element 42 in position relative to the raceway element 40 during the manufacturing process and even during handling by the ultimate user, but weak enough to be easily (and almost imperceptibly) broken when the user initially attempts to close and seal the collar 30 by relocating the slider element 42. No special action by the user is required to break the nicks 44.

As best seen in FIG. 1, the slider element 42 has a first portion 46 which defines the aperture 24a and a second portion 48 which is unapertured. When the slider element 42 is detached from the raceway element 40 by a user breaking the various nicks 44, the slider element 42 becomes slidably movable from a first or open position, wherein the aperture 24a of the slider element is aligned with the apertures 20a, 22a of the outer panels 20, 22 for enabling gaseous communication therebetween, to a second or closed position, wherein the unapertured second portion 48 is aligned with and blocks air flow between the apertures 20a, 22a of the outer panels 20, 22 for blocking gaseous communication therebetween.

Figure 2:
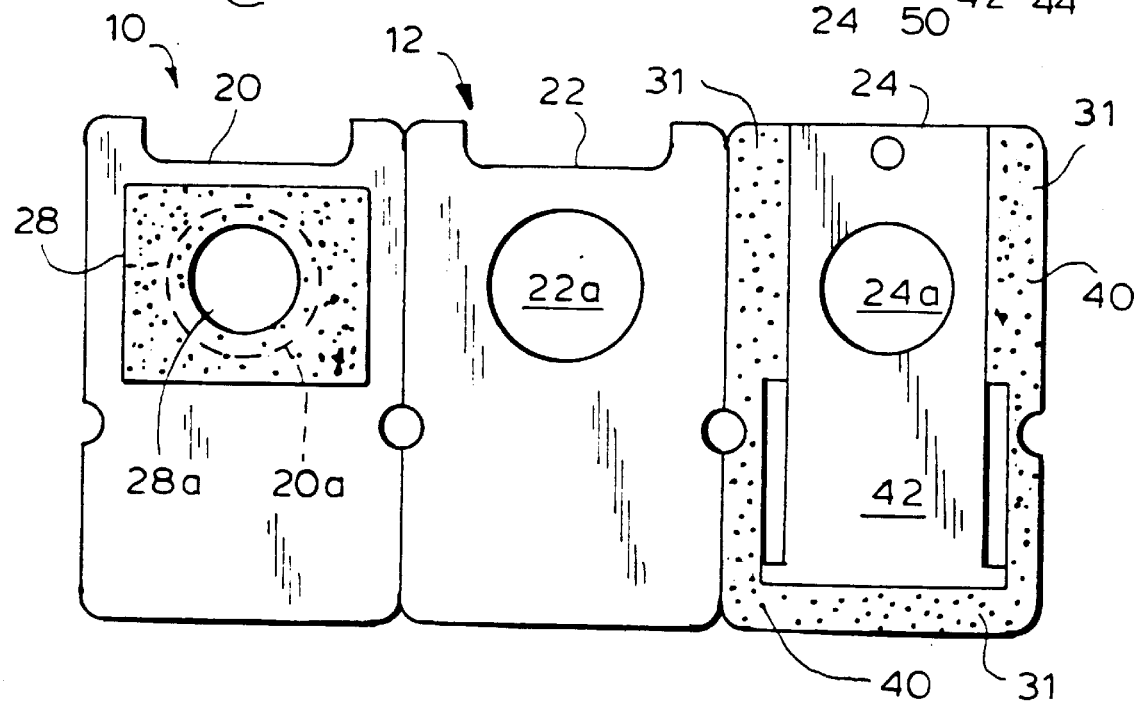
FIG. 2 is a view similar to FIG. 1, but showing a resilient membrane on the first panel and glue on the third panel.

Referring now to FIG. 2, a resilient membrane 28, typically of rectangular configuration, is disposed on one of the outer panels 20, 22 (as illustrated, on outer panel 20) and defines an aperture 28a therethrough which will be aligned with the apertures 20a, 22a of the outer panels and with the aperture 24a of the intermediate panel 24 when the panels 20, 22, 24 are folded to form the collar 30 and the slider element 42 is in the first or open position. The aperture 28a is smaller than the aperture 20a, 22a, 24a, but enlarges when in place on the air intake pipe.

Typically, the resilient membrane 28 is not glued to any panel, as glue deleteriously affects the rubber membrane, and the tightness of the adjacent faces of panels 20, 22, one against the other, in the collar 30 are adequate to maintain the resilient membrane 28 in the desired position.

Glue 31 (represented in the drawing by speckling) is placed either on the raceway element 40, as seen in FIG. 2, or on the portion of the outer panel 22 which will be contacted by the raceway element 40 in the collar 30.

Figure 3:
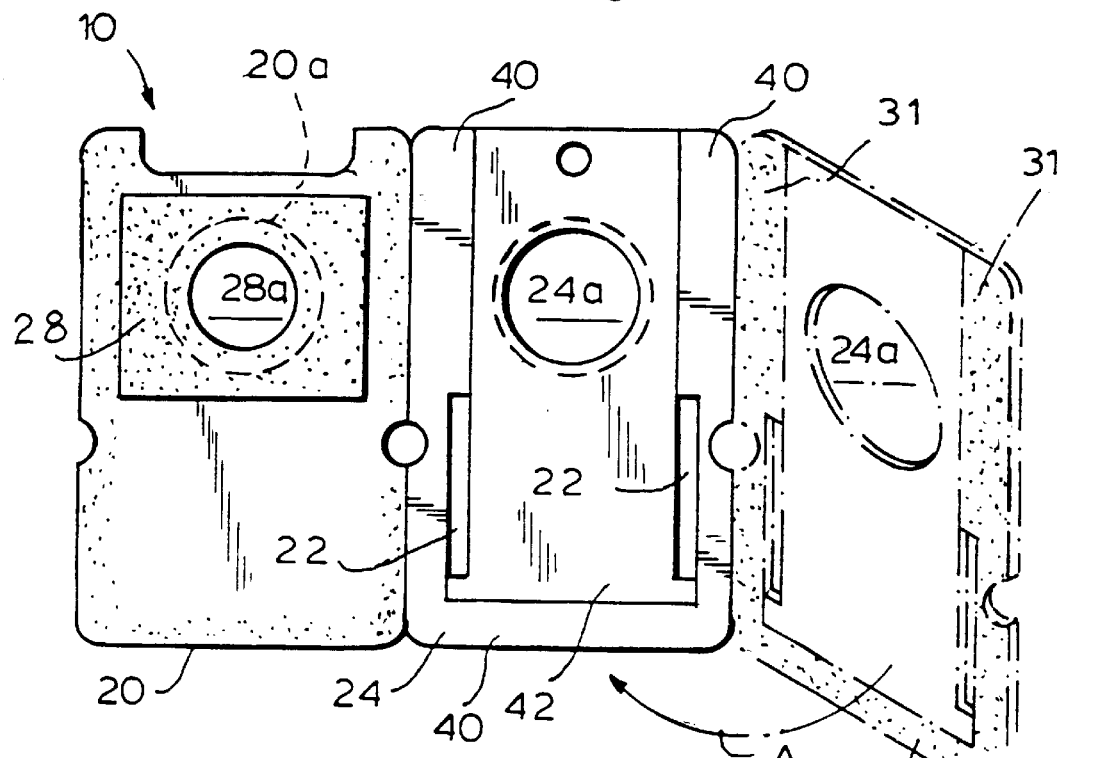
FIG. 3 is a view similar to FIG. 2, but with the third panel pivoted to overlap the second panel, the third panel also being seen in phantom line in an intermediate orientation.

Referring now to FIG. 3, the intermediate panel 24 is pivoted along foldline 26, in the direction of arrow A, until it overlies the outer panel 22 (thus hiding most of outer panel 22 from sight in FIG. 3) Glue 31 bonds the panels 22, 24 together.

Figure 4:
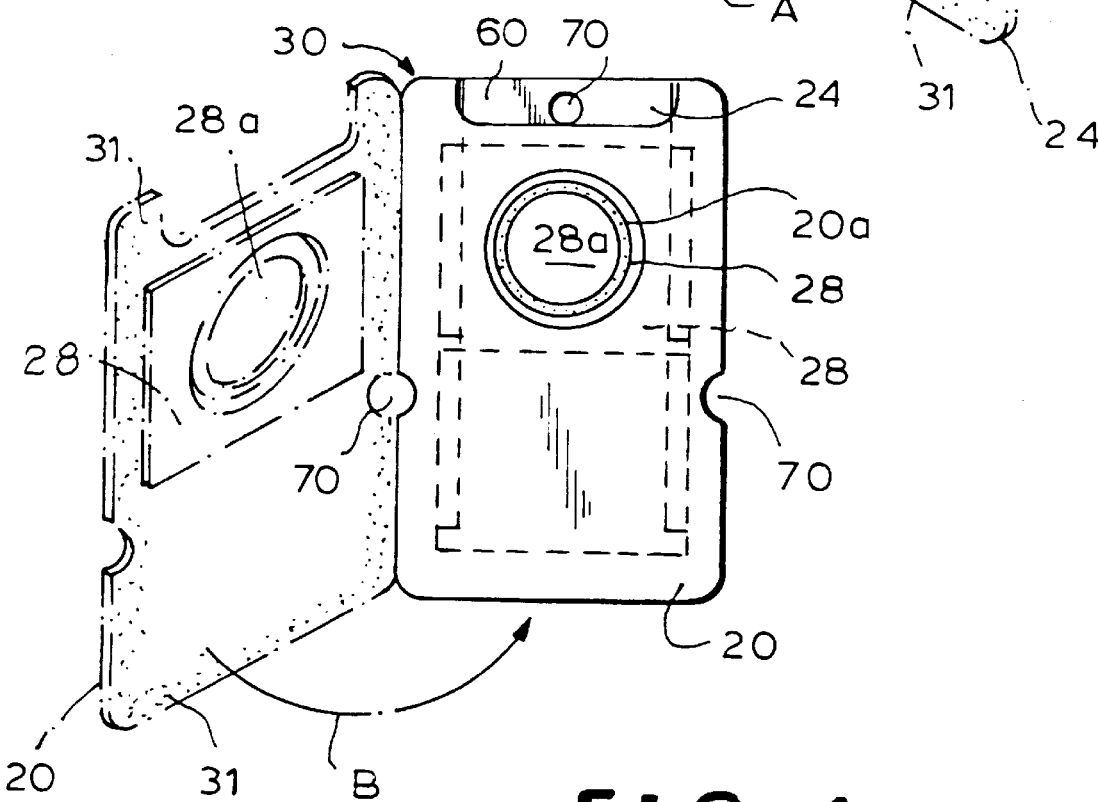
FIG. 4 is a view similar to FIG. 3, but with the first panel pivoted to overlap the second and third panels, the first panel also being seen in phantom line in an intermediate orientation.
Figure 9:
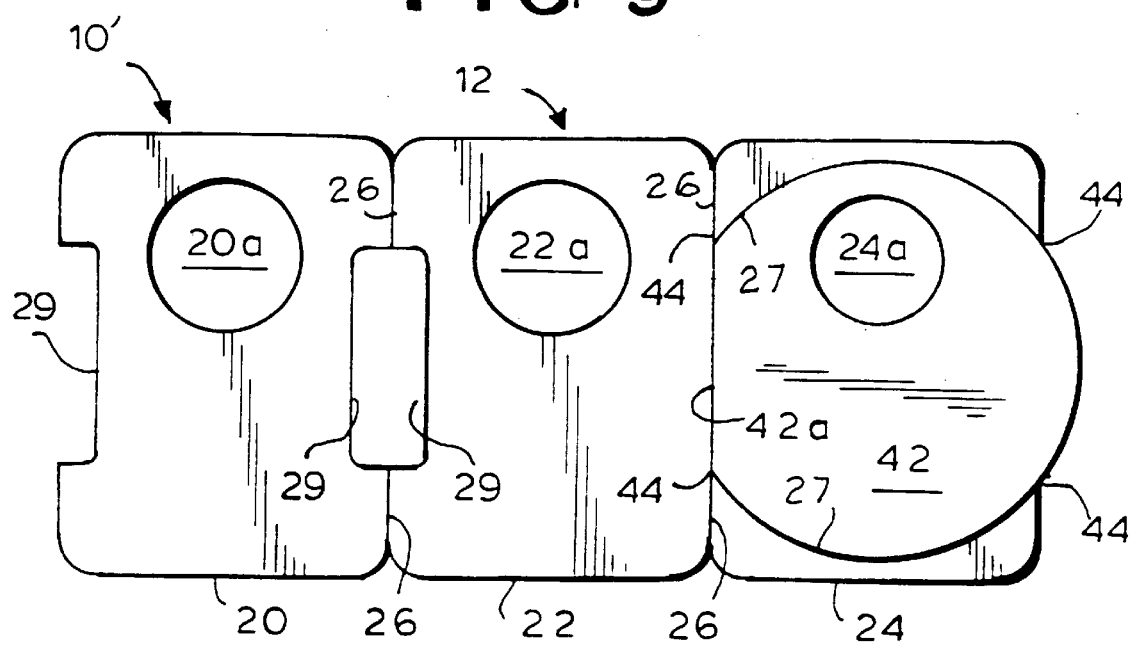
FIGS. 9–15 are views similar to FIGS. 1–7, but of a second embodiment of a collar according to the present invention.
Figure 10:
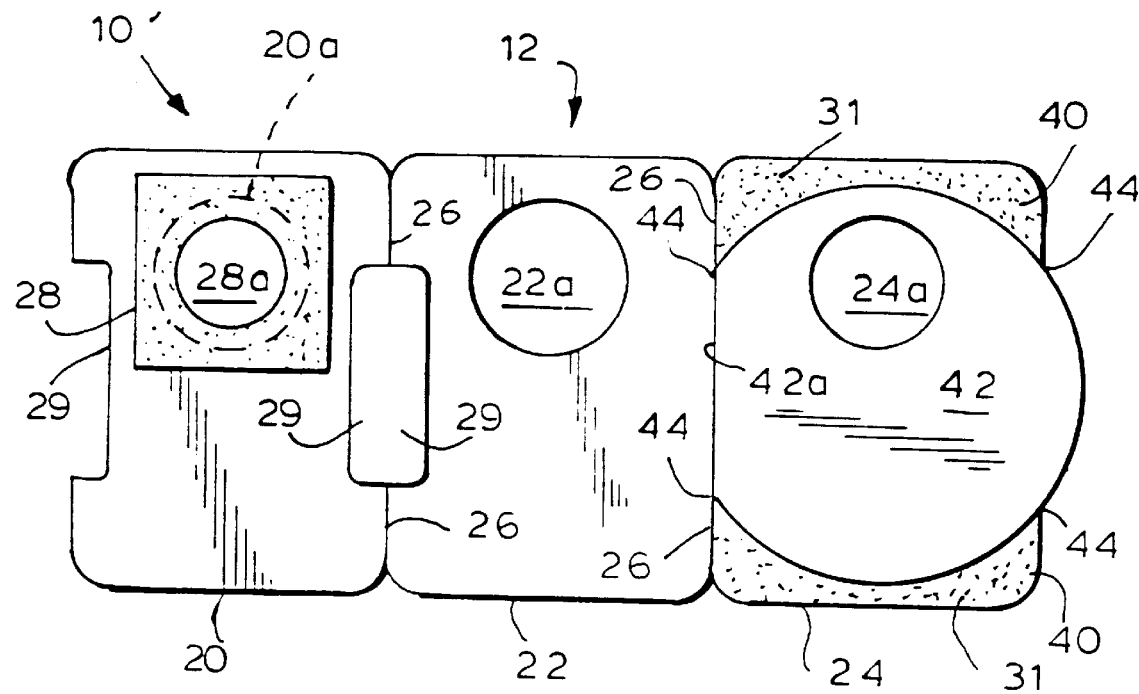
Figure 11:
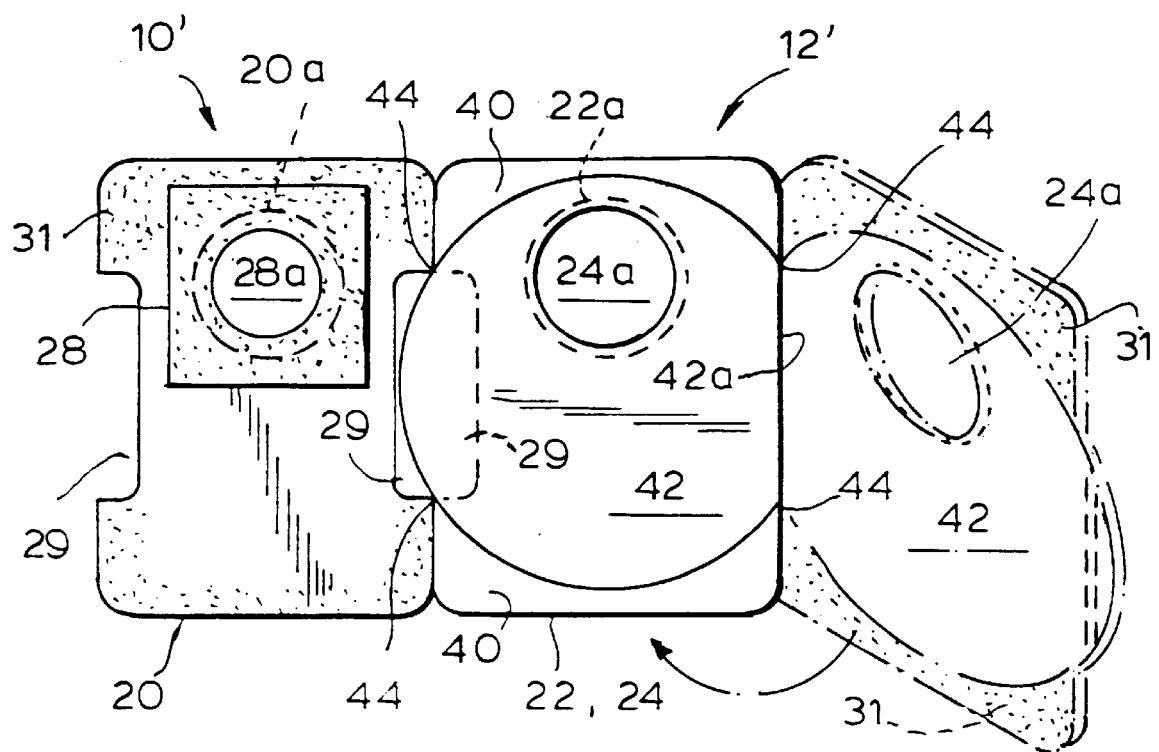

Referring now to FIG. 4, glue 31 is disposed on the portions of the outer panel 20 which will be contacted by the raceway element 40 in the collar 30, as illustrated, or alternatively on the exposed surface of the raceway element 40. Then the outer panel 20 is pivoted along foldline 26, in the direction of arrow B, until it overlies the exposed face of the intermediate panel 24 (thus hiding most of intermediate panel 24 from view in FIG. 4). Glue 31 bonds the panels 20, 24 together, with resilient membrane 28 therebetween, thereby to form the collar 30 of the present invention.

To facilitate breaking of the nicks 44, and generally to facilitate movement of the slider element 44 relative to the raceway element 40, the slider element 42 preferably includes a grasping portion 60 (as illustrated, the top portion thereof) extending beyond the outer panels 20, 22 of the collar 30 and enabling manual grasping of the slider element 42 by the user's fingers for detaching of the slider element 42 from the raceway element 40 and for subsequent movement thereof from the first or open position to the second or closed position. To provide this grasping portion 60 on the slider element 42, the outer panels 20, 22 preferably define recesses 29 enabling the user's fingers to grasp the projecting grasping portion 60 of the slider element 42.

To prevent a self-defeating movement of the slider element 42 which results in its over-extension, or even separation, from the raceway element 40, preferably the slider element 42 has the general configuration of an inverted "T", with the horizontal base defining a pair of stop ledges 52, and the raceway element 40 has the general configuration of a "U" with the legs defining a pair of inwardly extending stop flanges 54. When the unapertured second portion of the slider element 42 is properly positioned to block air flow between the apertures 20a, 22a of the outer panels 20, 22, further movement of the slider element 42 out of the raceway element 40 is blocked by the abutting engagement of the stop ledges 52 and stop flanges 54. The outer panels 20, 22, through their common adhesive bonding with the raceway element 40, maintain the slider element 42 and the raceway element 40 in substantially the same plane, thereby ensuring the appropriate abutment of stop ledges 52 and stop flanges 54 in the closed position.

The blank 12 preferably defines a plurality of small cutouts or notches 70 along the foldlines 26, the free longitudinal edges of the blank 12, and the grasping portion 60 of the slider element 42. As best seen in FIG. 5, in the collar 30 the cutouts at notches 70 along the foldlines 26 and the free longitudinal edges of the panels form semicircular notches on the longitudinal edges of the collar 30 to facilitate holding thereof, while the circular cutout 70 on the grasping portion 60 of the slider element 42 facilitates finger grasping of the slider element 42 for breakage of the nicks 44 and sliding movement of the slider element 42 relative to the raceway element 40 (and hence the remainder of the collar 30).

While the aperture 24a of the intermediate panel 24 is illustrated as being of lesser diameter than the apertures 20a, 22a of the outer panels 20, 22, this typically results from the lesser width of the slider element 42 relative to the width of the outer panels 20, 22. Where the slider element 42 is of sufficient width, the aperture 24a therein may be of equal or greater diameter than the apertures 20a, 22a of the outer panels 20, 22.

The blank 12 is preferably formed of board which is coated on only one side, as illustrated in FIG. 1 the back side of the blank 12. As one follows the folding of the blank from FIG. 1 through FIG. 4, it will be observed that the outer or visible surfaces of the outer panels 20, 22 of the collar 30 are formed by the coated side of the board and thus lend themselves well to printing for decorative, informative, or aesthetic content. Importantly, it is the coated surface of the slider element 42 of intermediate panel 24 which abuts and presses against the resilient membrane 28 disposed between the intermediate panel 24 and the outer panel 20 in the collar 30. As the resilient membrane 28 is held in place only by frictional forces between the two adjacent panels 20, 24, and not by any glue or adhesive, the coated surface of the slider element 42 enables the slider element 42 to be moved relative to the resilient membrane 28 with relatively little friction therebetween, so that there is little tendency of the resilient membrane 28 to crumple up and thereby block further movement of the slider element 42.

Referring now to FIGS. 9–15, therein illustrated is a second embodiment of the present invention, generally designated 10'. Elements of the second embodiment 10' which are functionally equivalent to elements of the first embodiment 10 are identified by the same reference numeral.

Figure 12:
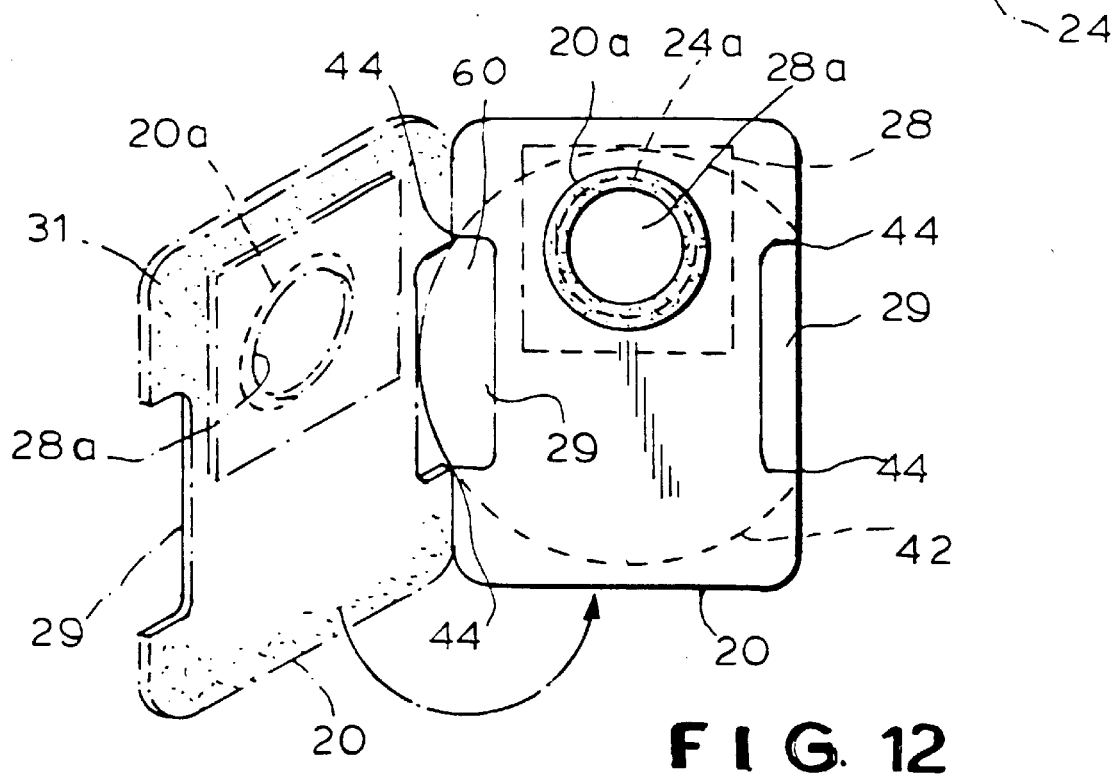
Figure 13:
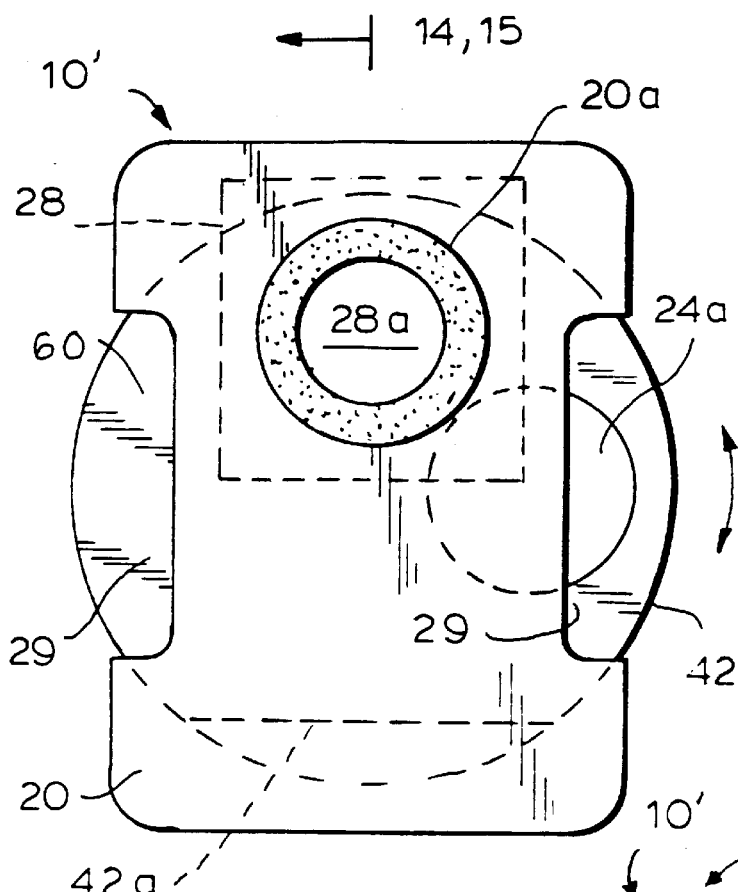
Figure 15:
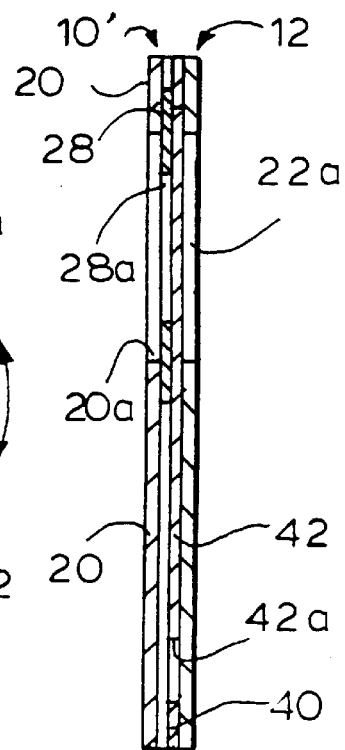
Figure 14:
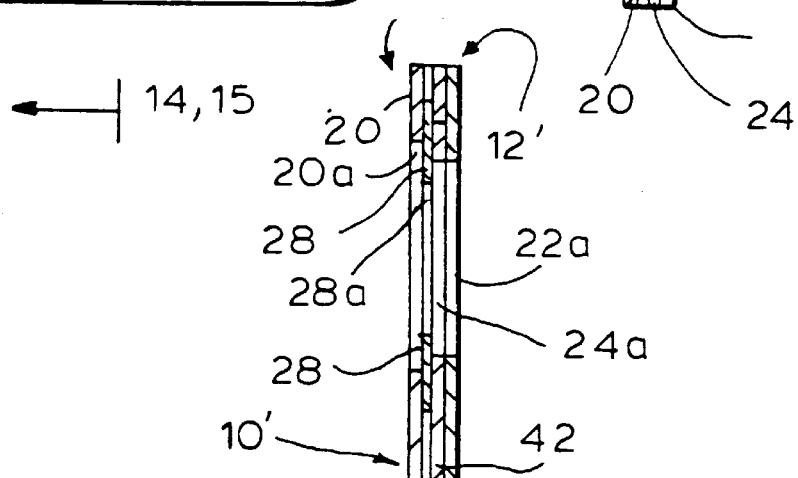

Broadly speaking, the basic difference between the two embodiments 10, 10' is that, in order to effect closure of the collar, in the first embodiment 10 the generally rectangular slider element 42 undergoes longitudinal sliding movement relative to the generally U-shaped raceway element 40 (as best seen by a comparison of FIGS. 4 and 5), whereas in the second embodiment 10' the generally circular slider element 42 undergoes a rotational sliding movement relative to the interrupted circular raceway element 40 resembling a pair of parentheses (as best seen by a comparison of FIGS. 12 and 13).

While FIG. 13 illustrates the closing movement of the slider element 42 as proceeding in a clockwise direction, clearly an equally effective closure can be effected by means of a counterclockwise movement of the slider element 42. A ninety degree rotation in either direction typically suffices to bring an unapertured portion of the slider element 42 intermediate panel apertures 20a, 22a and thereby close the collar 30.

In order to effect rotation of the slider element 42 relative to the raceway element 40, the user grasps the grasping portion 60 of the slider element 42 (projecting through the double width recess 29 jointly formed by the outer panels 20, 22) and rotates the same relative to the remainder of the collar 30. In initiating rotational movement of the slider element 42, the user easily and typically imperceptibly breaks the four nicks 44 at the interface of the slider element 42 and the raceway element 40 along the two longitudinal edges of the intermediate panel 24.

In the second embodiment 10', there is no need for means to preclude withdrawal of the slider element 42 entirely from the raceway element 40. Thus, there is no need for stop flanges 52 and stop ledges 54.

To summarize, the present invention provides a manually closable collar for a vacuum cleaner bag. The collar is economical to manufacture as does not require the collar to include a flexible portion and is easy to manufacture as it does not require a final cutting step in order to free the closure member (or sliding element) for movement relative to the remainder of the collar.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A manually closable collar for a vacuum cleaner bag, comprising:

a collar adapted to be secured to an air bag and formed of relatively rigid material defining three overlying and generally planar panels, each of said panels defining an aperture therethrough, said apertures being initially aligned in said collar to enable the passage of air therethrough and into the air bag, the middle panel of said collar defining:

(i) a fixed raceway element adhesively secured to at least one of the outer panels of said collar, and (ii) a detachable slider element secured to said raceway element only by various nicks, said slider element having a first portion defining said aperture of said middle panel and a second portion which is unapertured; when detached from said raceway element by a user breaking the various nicks, said slider element being manually slidably movable from a first or open position, wherein said aperture of said middle panel is aligned with the apertures of said outer panels, to a second or closed position, wherein said second portion blocks air flow between said apertures of said outer panels.

2. The collar of claim 1 wherein said raceway element includes means for precluding removal of said slider element entirely from said raceway element after said slider element is detached from said raceway element.

3. The collar of claim 1 wherein said aperture of said middle panel is smaller than said apertures of said outer panels.

4. The collar of claim 1 wherein said slider element additionally includes means extending beyond said outer panels and enabling manual grasping of said slider element for detaching of said slider element from said raceway element and for movement thereof from said first or open position to said second or closed position.

5. The collar of claim 1 wherein said slider element is axially slidably movable from said first or open position to said second or closed position.

6. The collar of claim 1 wherein said slider element is rotatably slidably movable from said first or open position to said second or closed position.

7. The collar of claim 1 additionally including:
a resilient membrane intermediate said middle panel and one of said outer panels and defining an aperture therethrough aligned with said apertures of said outer panels and with said aperture of said middle panel when said slider element is in said first or open position.

8. A manually closable collar for a vacuum cleaner bag, comprising:
(A) a collar adapted to be secured to an air bag and formed of relatively rigid material defining three overlying and generally planar panels, each of said panels defining an aperture therethrough, said apertures being initially aligned in said collar to enable the passage of air therethrough and into the air bag, said aperture of the middle panel of said collar being smaller than said apertures of the outer panels, said middle panel of said collar defining
  (i) a fixed raceway element adhesively secured to at least one of said outer panels of said collar, and
  (ii) a detachable slider element secured to said raceway element only by various nicks, said slider element having a first portion defining the aperture of said middle panel and a second portion which is unapertured; when detached from said raceway element by a user breaking the various nicks, said slider element being manually slidably movable from a first or open position, wherein said aperture of said middle panel is aligned with and enables air flow between the apertures of said outer panels, to a second or closed position, wherein said second portion is aligned with and blocks air flow between said apertures of said outer panels; said slider element additionally including means extending beyond said outer panels and enabling manual grasping of said slider element for detaching of said slider element from said raceway element and for movement thereof from said first or open position to said second or closed position; said raceway element further including means for precluding removal of said slider element entirely from said raceway element after said slider element is detached from said raceway element; and
(B) a resilient membrane intermediate said middle panel and one of said outer panels and defining an aperture therethrough aligned with said apertures of said outer panels and with said aperture of said middle panel when said slider element is in said first or open position.

9. A method of making a manually closable collar for a vacuum cleaner bag from a single collar blank, comprising the steps of:
(A) folding a single collar blank of relatively rigid material to define three overlying and generally planar panels, each of the panels defining an aperture therethrough, the apertures being initially aligned in the folded blank to enable the passage of air therethrough, the middle panel of the collar defining a fixed raceway element and a detachable slider element secured to the raceway element only by various nicks, and the slider element having a first portion defining the aperture of the middle panel and a second portion which is unapertured;
(B) adhesively securing the raceway element to at least one of the outer panels;
when detached from the raceway element by the user of the vacuum bag breaking the various nicks, the slider element being manually slidably movable from a first or open position, wherein the aperture of the middle panel is aligned with and enables air flow between the apertures of the outer panels, to a second or closed position, wherein the second portion is aligned with and blocks air flow between the apertures of the outer panels.

10. The method of claim 9 including the initial step of preparing the middle panel for folding by severing the slider element from the raceway element except for the various nicks.

11. The method of claim 9 including the additional step of disposing a resilient membrane intermediate the middle panel and the other of the outer panels, the resilient membrane defining an aperture aligned with the outer panel apertures.

\* \* \* \* \*